(12) United States Patent
Ognissanti et al.

(10) Patent No.: US 6,670,008 B1
(45) Date of Patent: Dec. 30, 2003

(54) TAMPER-EVIDENT LABEL WITH MULTIPLE PRESSURE-SENSITIVE ADHESIVES OF DIFFERENT SENSITIVITY

(76) Inventors: Amanda G. Ognissanti, 201 Orchard Ave., Baltimore, MD (US) 21225; Charles F. Pribyl, 9022 Naygau Rd., Baltimore, MD (US) 21234

( * ) Notice: Subject to any disclaimer, the term of this patent is extended or adjusted under 35 U.S.C. 154(b) by 0 days.

(21) Appl. No.: 10/118,018

(22) Filed: Apr. 9, 2002

(51) Int. Cl.7 .................................................. G09F 3/03
(52) U.S. Cl. ........................ 428/40.1; 283/81; 383/5; 383/84; 428/41.9; 428/42.1; 428/42.2; 428/42.3; 428/200; 428/913
(58) Field of Search ............................. 428/40.1, 41.9, 428/42.1, 42.2, 42.3, 200, 913; 283/81; 383/5, 84

(56) References Cited

U.S. PATENT DOCUMENTS

| | | | |
|---|---|---|---|
| 4,738,472 A | 4/1988 | Shibata | |
| 4,937,040 A | * 6/1990 | Holcomb | ........................ 383/5 |
| 5,319,475 A | 6/1994 | Kay et al. | |
| 5,411,295 A | 5/1995 | Bates et al. | |
| 5,979,357 A | 11/1999 | Peavey | |
| 6,149,203 A | 11/2000 | Hanlon | |
| 6,303,202 B1 | 10/2001 | Washburn et al. | |
| 6,326,071 B1 | 12/2001 | Francoeur | |

* cited by examiner

Primary Examiner—Nasser Ahmad
(74) Attorney, Agent, or Firm—Robert D. Morelli

(57) ABSTRACT

A tamper-evident label that includes a substrate. On the substrate is deposited more than one adhesive. Each adhesive is sensitive to a different condition. The adhesives are deposited throughout the substrate in user-definable patterns. A release layer is placed on the adhesives for ease of transport and application, but is removed prior to affixation of the tamper-evident label.

5 Claims, 1 Drawing Sheet

TAMPER-EVIDENT LABEL WITH MULTIPLE PRESSURE-SENSITIVE ADHESIVES OF DIFFERENT SENSITIVITY

(U) FIELD OF THE INVENTION

The present invention relates, in general, to stock material or miscellaneous articles and, in particular, to a structurally defined web or sheet.

BACKGROUND OF THE INVENTION

For some items, it is important to know whether or not they were tampered with (e.g., evidence in a criminal trial, food, medicine, a ticket). One way of indicating whether or not an item was tampered with is to place a label on the item that would be visibly and irreversibly altered if disturbed. Such a label is often referred to as a tamper-evident label.

U.S. Pat. No. 4,738,472, entitled "THERMOSENSITIVE LABEL RENDERED UNUSABLE BY REMOVAL FROM ITS FIRST APPLICATION" discloses a tamper-evident label that includes a water-activated adhesive and a thermosensitive dye. The present invention does not include either a water-activated adhesive or a thermosensitive dye. U.S. Pat. No. 4,738,472 is hereby incorporated by reference into the specification of the present invention.

U.S. Pat. No. 5,319,475, entitled "TAMPER RESISTING HOLOGRAPHIC SECURITY SEAL," discloses a tamper-evident label that includes an optical diffraction pattern that undergoes an irreversible change if tampered with, heated, or chilled. The present invention does not include an optical diffraction pattern. U.S. Pat. No. 5,319,475 is hereby incorporated by reference into the specification of the present invention.

U.S. Pat. No. 5,411,295, entitled "TAMPER EVIDENT LABEL," discloses a tamper-evident label that includes water-soluble and water-insoluble indicia or graphics. The present invention does not include water-soluble or water-insoluble graphics. U.S. Pat. No. 5,411,295 is hereby incorporated by reference into the specification of the present invention.

U.S. Pat. No. 5,979,357, entitled "EVIDENCE SEALING TAPE WITH FINGERPRINT IDENTIFICATION ZONE," discloses a tamper-evident label that includes an identification portion for receiving a fingerprint. The present invention does not include an identification portion for receiving a fingerprint. U.S. Pat. No. 5,979,357 is hereby incorporated by reference into the specification of the present invention.

U.S. Pat. No. 6,149,203, entitled "TAMPER-EVIDENT CLOSURE SEAL," discloses a tamper-evident label that includes an imprinted pattern of adjoining matte and high-gloss areas. The present invention does not include an imprinted patter with adjoining matte and high-gloss areas. U.S. Pat. No. 6,149,203 is hereby incorporated by reference into the specification of the present invention.

U.S. Pat. No. 6,303,202, entitled "SECURE STICKER AND INTEGRATED LABEL/FORM," discloses a tamper-evident label that includes a paper ply and printed matter sealed in a resin and a liner ply that defines a label portion and a removable portion. The present invention does not include a paper ply, printed matter, a resin, or a liner ply that defines a label or a removable portion. U.S. Pat. No. 6,303,202 is hereby incorporated by reference into the specification of the present invention.

U.S. Pat. No. 6,326,071, entitled "REVERSE THERMAL LABEL," discloses a tamper-evident label that includes a thermally-imprintable color producing layer. The present invention does not include a thermally-imprintable color producing layer. U.S. Pat. No. 6,326,071 is hereby incorporated by reference into the specification of the present invention.

SUMMARY OF THE INVENTION

It is an object of the present invention to indicate tamper of the label of the present invention if the label is subjected to one of a plurality of tamper techniques.

It is another object of the present invention to include a plurality of adhesive types on the label of the present invention that are sensitive to different conditions.

The present invention is a tamper-evident label that includes a substrate, a plurality of pressure-sensitive adhesives applied to the substrate in user-definable patterns, and a release sheet.

The tamper-evident label is applied to an item of interest by removing the release sheet and pressing the adhesive-side of the label against the item. The adhesives are sensitive to different conditions under which someone might attempt to remove the label. If someone were to attempt to remove the label intact under one of the conditions for which the adhesives are sensitive, the substrate would fracture, rendering the label un-useable as an intact label and, therefore, defeating any attempt to remove the label, tamper with the item, and reseal the item with the label to avoid detection.

DETAILED DESCRIPTION

The present invention is a tamper-evident label that prevents intact removal of the label under multiple conditions from the item to which the label is attached. The tamper-evident label of the present invention may be any size, shape, or length. The tamper-evident label may be short for use as a sticker or long for use as sealing tape. Prior art tamper-evident labels use only one type of adhesive to affix the label and, therefore, may not be able to prevent intact removal of the label, or adhere, under multiple conditions as does the present invention.

Figure 1:
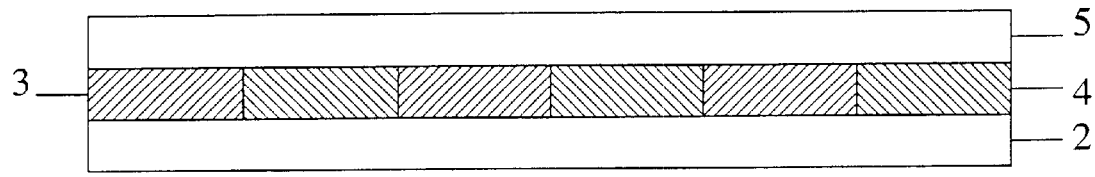
FIG. 1 is a cross-section of the tamper-evident label of the present invention.

FIG. 1 is a cross-section of the tamper-evident label 1 of the present invention. The tamper-evident label 1 includes a substrate 2. Fracturing of the substrate 2 is the mechanism for indicating tamper in the present invention A plurality of pressure-sensitive adhesives 3, 4 are applied to the substrate 2 in user-definable patterns that cause the substrate 2 to fracture if an attempt were made to remove the substrate 2 under conditions for which the adhesives 3, 4 are sensitive after affixation of the substrate 2, adhesive-side down, to an item of interest. Two different adhesives 3, 4 are shown in FIG. 1, but any number of adhesives with different sensitivities may be used. The use of multiple adhesives in the present invention also allows the tamper-evident label 1 to adhere under conditions (e.g., cold temperature, hot temperature, wet conditions) under which all but one of the adhesives might not provide adhesion. Such adhesion is required in those applications where such diverse conditions exist (e.g., car windshield).

The substrate 2 is selected from the group of substrates consisting of a plastic substrate, a paper substrate, a polymer substrate, and any other suitable substrate.

In the preferred embodiment, three adhesives are used, where the first adhesive is sensitive to temperatures in the range from around 25 degrees Celsius to around 70 degrees Celsius, where the second adhesive is sensitive to temperatures in the range from 25 degrees Celsius to around −55 degrees Celsius, and where the third adhesive is sensitive to solvent (e.g., paint remover, window cleaner, nail polish remover). Under the condition for which an adhesive is sensitive, the substrate 2 fractures upon an attempt to remove the tamper-evident label 1.

Adhesives that are sensitive to temperatures in the range from around 25 degrees Celsius to around −55 degrees Celsius include adhesives FASSON® AT1, FASSON® C2500, FASSON® CT8, and FASSON® FG5. Adhesives that are sensitive to temperatures in the range from around 25 degrees Celsius to around 70 degrees Celsius include FASSON® LP430, FASSON® P925, and FASSON® PL3000. Adhesives that are sensitive to solvents include FASSON® FDA815K, FASSO® FDA815PL, and FASSON® P910. Other possible adhesives include FASSON® P900 and 3M® optically clear laminating adhesives 8141, 8142, 8161, and 9483.

Figure 2:
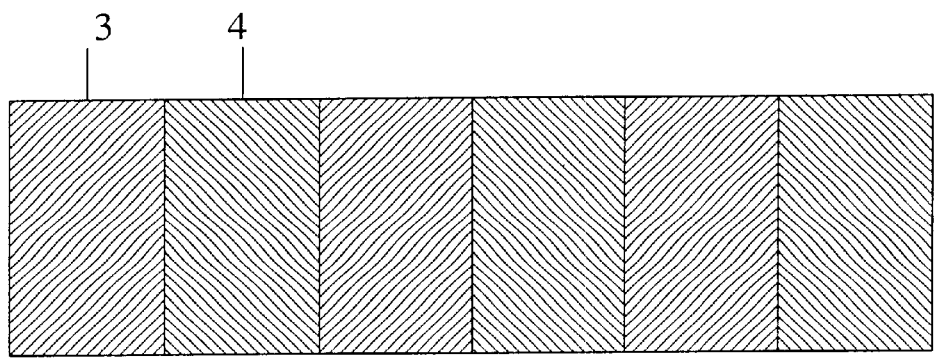
FIG. 2 is a top-view of a pattern of adhesives of the tamper-evident label.
Figure 3:
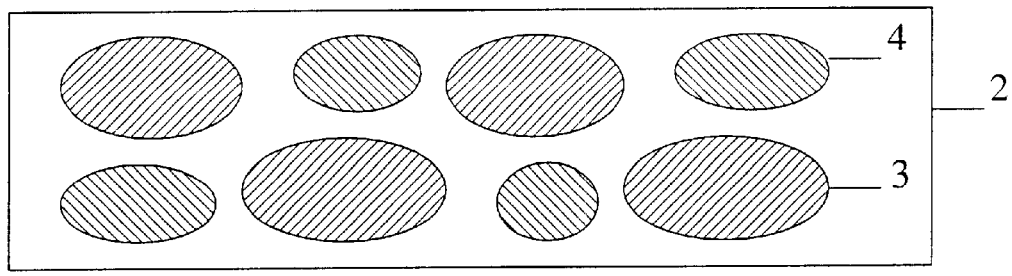
FIG. 3 is a top-view of an alternate pattern of adhesives of the tamper-evident label.

The adhesives 3, 4 may be pattered on the substrate 2 in any suitable pattern. Possible patterns include stripes, blotches, a unique pattern, or any other suitable pattern. In each pattern, the adhesives 3, 4 are distributed throughout the substrate 2 to insure that each sector of the substrate 2 includes each adhesive 3, 4 type. FIG. 2 is a top view of the adhesives 3, 4 on the substrate 2, where the adhesives 3, 4 are deposited in a striped pattern. FIG. 3 is a top view of the adhesives 3, 4 on the substrate 2, where the adhesives 3, 4 are deposited in a blotchy pattern.

The adhesives 3, 4 chemically react to the surface (not shown) to which the adhesives are affixed to form a bond between the adhesives 3, 4 and the surface. In the preferred embodiment, the material of the surface to which the adhesives 3, 4 are affixed include aluminum, stainless steel, and plastic. The degree of surface flatness to which the adhesives 3, 4 adhere range from smooth to pebbled.

For handling purposes prior to affixation of the substrate 2, a release sheet 5 shown in FIG. 1 is placed on the plurality of adhesive layers 3, 4.

The tamper-evident label 1 of the present invention uses multiple adhesives on a single substrate to indicates tamper under multiple conditions, whereas prior art tamper-evident labels do not.

What is claimed is:

1. A tamper-evident label, comprising (a) a substrate;

(b) a plurality of adhesives deposited on the substrate in user-definable patterns, where each adhesive has a different sensitivity; where the sensitivities of the plurality of adhesives include a sensitivity to a first range of temperatures, a sensitivity to a second range of temperatures, and a sensitivity to a solvent; and where each of said plurality of adhesives is distributed throughout the substrate; and (c) a release layer on the plurality of adhesives.

2. The device of claim 1, wherein the substrate is selected from the group of substrates consisting of a plastic substrate, a paper substrate, a polymer substrate, and any other suitable substrate.

3. The device of claim 1, wherein the first range of temperatures is in the range of around 25 degrees Celsius to around −55 degrees Celsius.

4. The device of claim 1, wherein the second range of temperatures is in the range of around 25 degrees Celsius to around 70 degrees Celsius.

5. The device of claim 1, wherein each of said user-definable pattern is selected from the group of patterns consisting of stripes, blotches, unique pattern, or any other suitable pattern.

* * * * *